(12) United States Patent
Nakamura (10) Patent No.: US 6,703,750 B2
(45) Date of Patent: Mar. 9, 2004

(54) STATOR OF ROTARY ELECTRIC MACHINE AND METHOD FOR MAKING THE SAME

(75) Inventor: Shigenobu Nakamura, Anjo (JP)

(73) Assignee: Denso Corporation, Kariya (JP)

( * ) Notice: Subject to any disclaimer, the term of this patent is extended or adjusted under 35 U.S.C. 154(b) by 67 days.

(21) Appl. No.: 09/842,915

(22) Filed: Apr. 27, 2001

(65) Prior Publication Data

US 2001/0038251 A1 Nov. 8, 2001

(30) Foreign Application Priority Data

Apr. 27, 2000 (JP) .................................... 2000-127226
May 24, 2000 (JP) .................................... 2000-153140

(51) Int. Cl.⁷ .......................... H02K 3/12; H02K 19/22
(52) U.S. Cl. ...................................... 310/184; 310/180
(58) Field of Search ........................... 310/180, 184, 310/71

(56) References Cited

U.S. PATENT DOCUMENTS

| | | | |
|---|---|---|---|
| 1,822,261 A | 9/1931 | Apple | 310/201 |
| 1,826,295 A | 10/1931 | Apple | 310/201 |
| 2,407,935 A | 9/1946 | Perfetti et al. | 310/201 |
| 2,928,963 A | 3/1960 | Bertsche et al. | 310/168 |
| 3,450,913 A | 6/1969 | Baker et al. | 310/159 |
| 3,453,468 A | 7/1969 | Lund | 310/180 |
| 4,095,333 A | 6/1978 | Kuter et al. | 29/598 |
| 4,454,464 A | 6/1984 | Stroud | 310/198 |
| 4,541,575 A * | 9/1985 | Dickerson | 310/166 |
| 4,870,307 A | 9/1989 | Kitamura et al. | 310/54 |
| 5,093,591 A | 3/1992 | Kitamura et al. | 310/62 |
| 5,097,167 A | 3/1992 | Kanayama et al. | 310/201 |
| 5,122,705 A | 6/1992 | Kusase et al. | 310/180 |
| 5,132,581 A | 7/1992 | Kusase | 310/263 |
| 5,160,864 A | 11/1992 | Saito | 310/54 |
| 5,191,257 A | 3/1993 | Sugiyama | 310/198 |
| 5,536,987 A | 7/1996 | Hayashi et al. | 310/263 |
| 5,574,324 A | 11/1996 | Hirama et al. | 310/94 |
| 5,691,590 A | 11/1997 | Kawai et al. | 310/180 |
| 5,708,316 A | 1/1998 | Ishida | 310/184 |

(List continued on next page.)

FOREIGN PATENT DOCUMENTS

| | | |
|---|---|---|
| DE | 1005611 | 4/1957 |
| DE | 3704780 A1 | 11/1988 |
| DE | 39 01 098 | 4/1990 |

(List continued on next page.)

OTHER PUBLICATIONS

Masami, "AC Generator for Vehicle", Patent Abstracts of Japan, Pub. No. 3–27748, Feb. 6, 1991.
Kuzuhiko, "Motor Having Stator Winding", Patent Abstracts of Japan, Pub. No. 9–19096, Jan. 17, 1997.
Toronron, "Thrust Bearing", Patent Abstracts of Japan, Pub. No. 9–117095, May 2, 1997.

Primary Examiner—Burton Mullins
(74) Attorney, Agent, or Firm—Oliff & Berridge, PLC (57) ABSTRACT

A rotary electric machine has a stator core and a winding. The winding has a plurality of sub-winding sets which are mounted on the stator core in the order. Each of the sub-winding sets has a plurality of phase windings. Each of the phase windings is made of a continuous wire. The sub-winding sets are formed into a cylindrical shape having a plurality of straight portions and turn portions before the sub-winding sets are mounted on the stator core. The turn portions are regularly arranged to avoid collisions between the turn portions. It is possible to avoid collisions since the winding is mounted on.

1 Claim, 11 Drawing Sheets

U.S. PATENT DOCUMENTS

| | | | |
|---|---|---|---|
| 5,742,498 A | 4/1998 | Taniguchi et al. | 363/145 |
| 5,778,512 A | 7/1998 | Ichikawa et al. | 29/598 |
| 5,845,389 A | 12/1998 | Roberts et al. | 29/596 |
| 5,955,810 A * | 9/1999 | Umeda et al. | 310/201 |
| 5,965,965 A | 10/1999 | Umeda et al. | 310/52 |
| 5,982,068 A | 11/1999 | Umeda et al. | 310/206 |
| 5,998,903 A | 12/1999 | Umeda et al. | 310/179 |
| 6,049,154 A | 4/2000 | Asao et al. | 310/201 |
| 6,137,201 A * | 10/2000 | Umeda et al. | 310/179 |
| 6,144,136 A | 11/2000 | Umeda et al. | 310/234 |
| 6,170,974 B1 * | 1/2001 | Hyypio | 310/179 |
| 6,198,190 B1 | 3/2001 | Umeda et al. | 310/179 |
| 6,211,594 B1 * | 4/2001 | Umeda et al. | 310/180 |

FOREIGN PATENT DOCUMENTS

| | | |
|---|---|---|
| EP | 0740403 A1 | 4/1996 |
| EP | 0 881 742 A2 | 12/1998 |
| FR | 482064 | 2/1917 |
| FR | 1465068 | 1/1996 |
| JP | 48-442 | 1/1973 |
| JP | 50-47102 | 4/1975 |
| JP | 56-98358 | 7/1981 |
| JP | 59-501691 | 4/1984 |
| JP | 59-159638 | 9/1984 |
| JP | 61-221561 | 1/1986 |
| JP | 62-272836 | 11/1987 |
| JP | 63-257435 | 10/1988 |
| JP | 63-274335 | 11/1988 |
| JP | 64-5340 | 1/1989 |
| JP | 2-214440 | 8/1990 |
| JP | 3-159549 | 9/1991 |
| JP | 4-26345 | 1/1992 |
| JP | 6-165422 | 6/1994 |
| JP | 7-303351 | 11/1995 |
| JP | 8-205441 | 8/1996 |
| JP | 8-298756 | 11/1996 |
| JP | 8-331818 | 12/1996 |
| JP | 9-56128 | 2/1997 |
| JP | 9-182337 | 7/1997 |
| WO | 84-01478 | 4/1984 |
| WO | 92-06527 | 4/1992 |
| WO | WO 92/06527 | 4/1992 |

* cited by examiner

STATOR OF ROTARY ELECTRIC MACHINE AND METHOD FOR MAKING THE SAME

CROSS REFERENCE TO RELATED APPLICATION

This application is based on Japanese Patent Applications No. 2000-127226 filed on Apr. 27, 2000 and No. 2000-153140 filed on May 24, 2000 the contents of which are incorporated herein by reference.

BACKGROUND OF THE INVENTION

1. Field of the Invention

The present invention relates to a stator of a rotary electric machine.

2. Description of Related Art

JP-A-11-299153 discloses an alternator for a vehicle which has a stator with curled coil ends. The portions of the coil, disposed between slots which are spaced apart by a predetermined pitch, are curled and twisted in a radial direction at the center. Therefore, all curled portions of the coil are circumferentially arranged side by side. In this arrangement, it is difficult to arrange the curled portions to avoid collisions with other portions, since the coil is widened at the curled portions especially when a thick coil wire is used.

JP-B-2927288 and JP-A-11-164506 disclose alternators for a vehicle having stator windings which are made of a plurality of segments welded to each other. In this arrangement, the welded portions require a complicated manufacturing process and an additional insulating process.

SUMMARY OF THE INVENTION

The present invention addresses these drawbacks by providing an improved stator arrangement and an improved manufacturing method.

It is therefore an object of this invention to provide an improved stator of a rotary electric machine.

It is a further object of this invention to provide a stator of a rotary electric machine which has a novel arrangement of windings.

According to a first aspect of the present invention, the stator of the rotary electric machine comprises a plurality of sub-winding sets. Each sub-winding set comprises a plurality of phase windings. Each of the phase windings is made of a continuous wire providing an individual coil on a stator core. The phase windings in the same phase are connected via connecting portions provided outside of the stator core. The turn portions are arranged on each of the sub-winding sets. Therefore, it is possible to avoid collisions between the turn portions. The continuous wire is capable of reducing connections on the poly-phase winding.

In the present invention, the phase winding may have at least three straight portions and two turn portions which are provided by the continuous wire.

The sub-winding sets can be mounted on the stator core by shrinking the sub-winding sets, inserting the shrunken sub-winding sets into a cavity of the stator core and expanding the shrunken sub-winding sets.

According to the another aspect of the present invention, a stator of a rotary electric machine comprises a poly-phase winding comprising a plurality of phase windings. Each of the phase windings is made of a continuous wire. The turn portions of each windings are arranged side by side with respect to a radial direction on one side of the stator core. It is possible to avoid collisions between the turn portions since the turn portions are arranged side by side. The continuous wire reduces the number of connections on the poly-phase winding.

The poly-phase winding may be formed by preparing a poly-phase wave winding having first turn portions, and forming at least two straight portions and a second turn portion between them on each of the middle portions of the poly-phase wave winding. The second turn portions may be formed by folding the wave winding at a predetermined position and shifting the straight portions placed on both sides of the predetermined position by a predetermined magnetic pole pitch. The straight portions may be shifted before folding.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
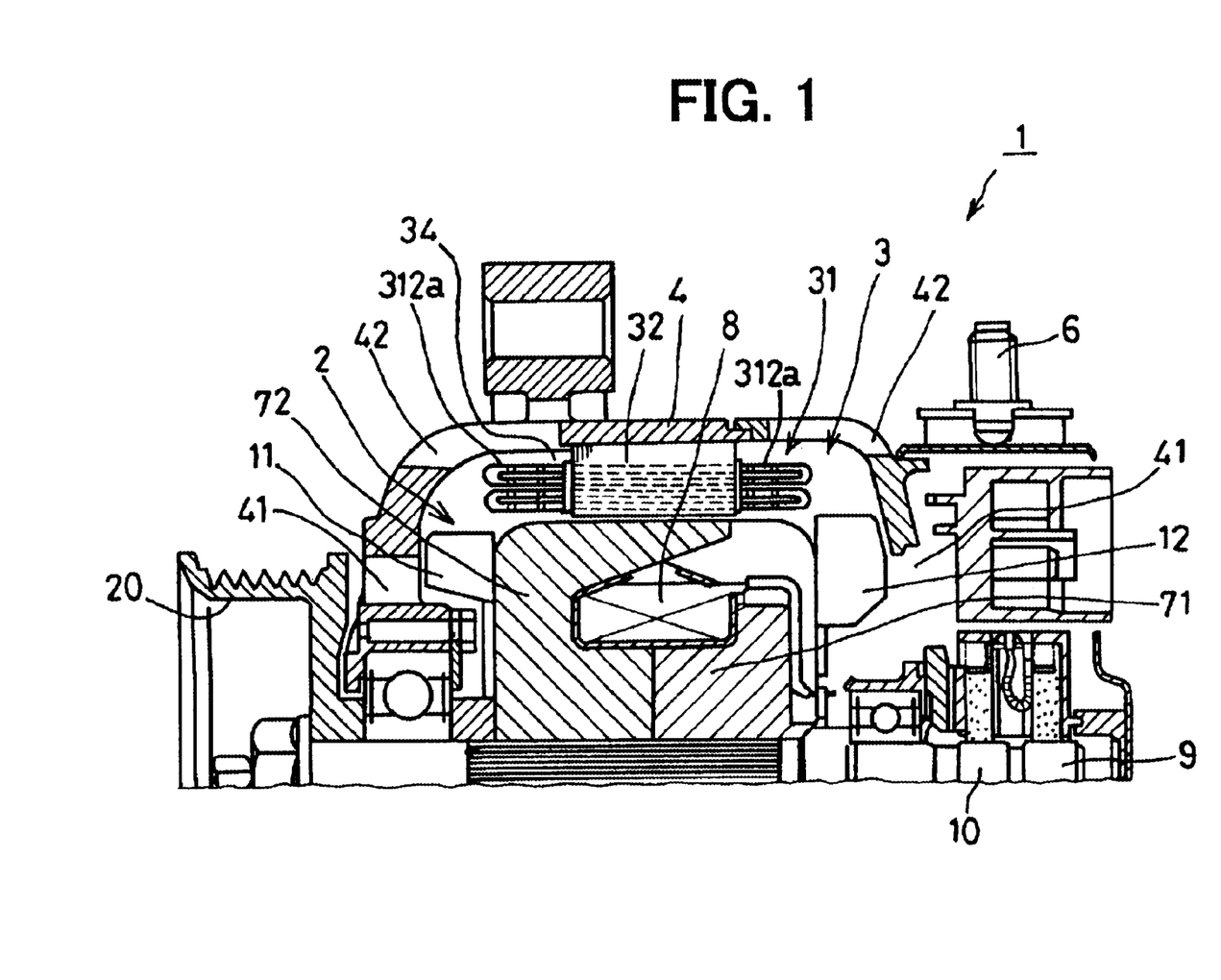
FIG. 1 is a sectional view of an alternator for vehicle according to a first embodiment of the present invention.
Figure 2:
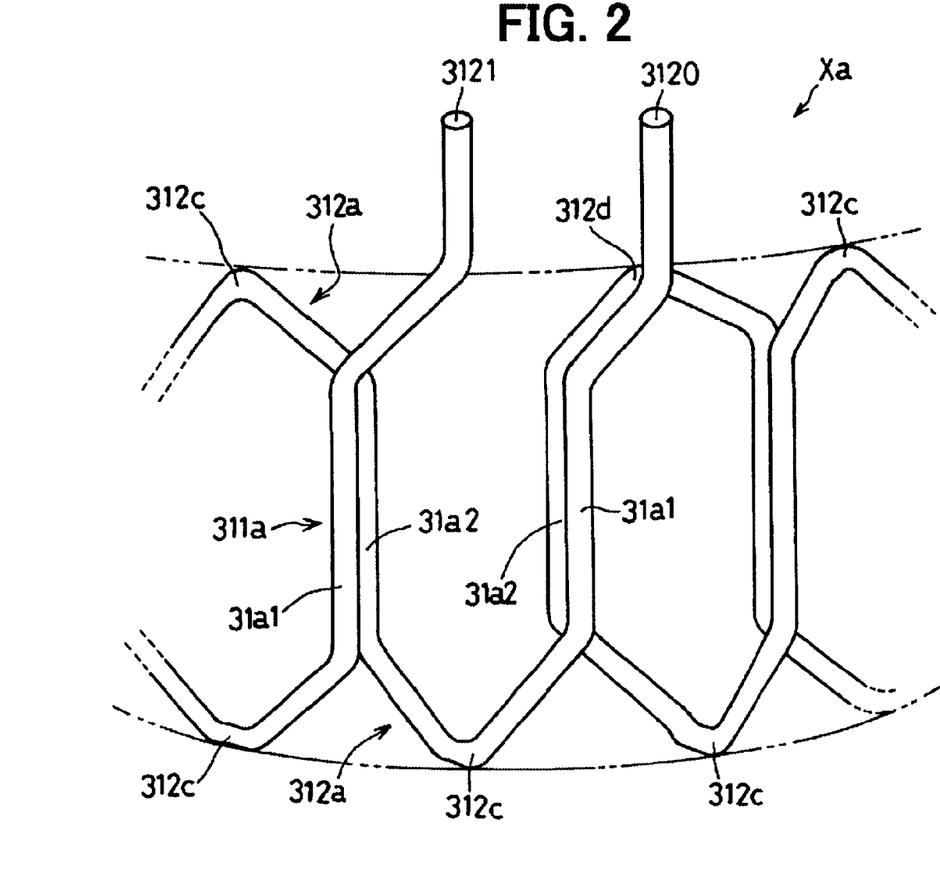
FIG. 2 is a perspective view of a winding according to the first embodiment of the present invention.
Figure 3:
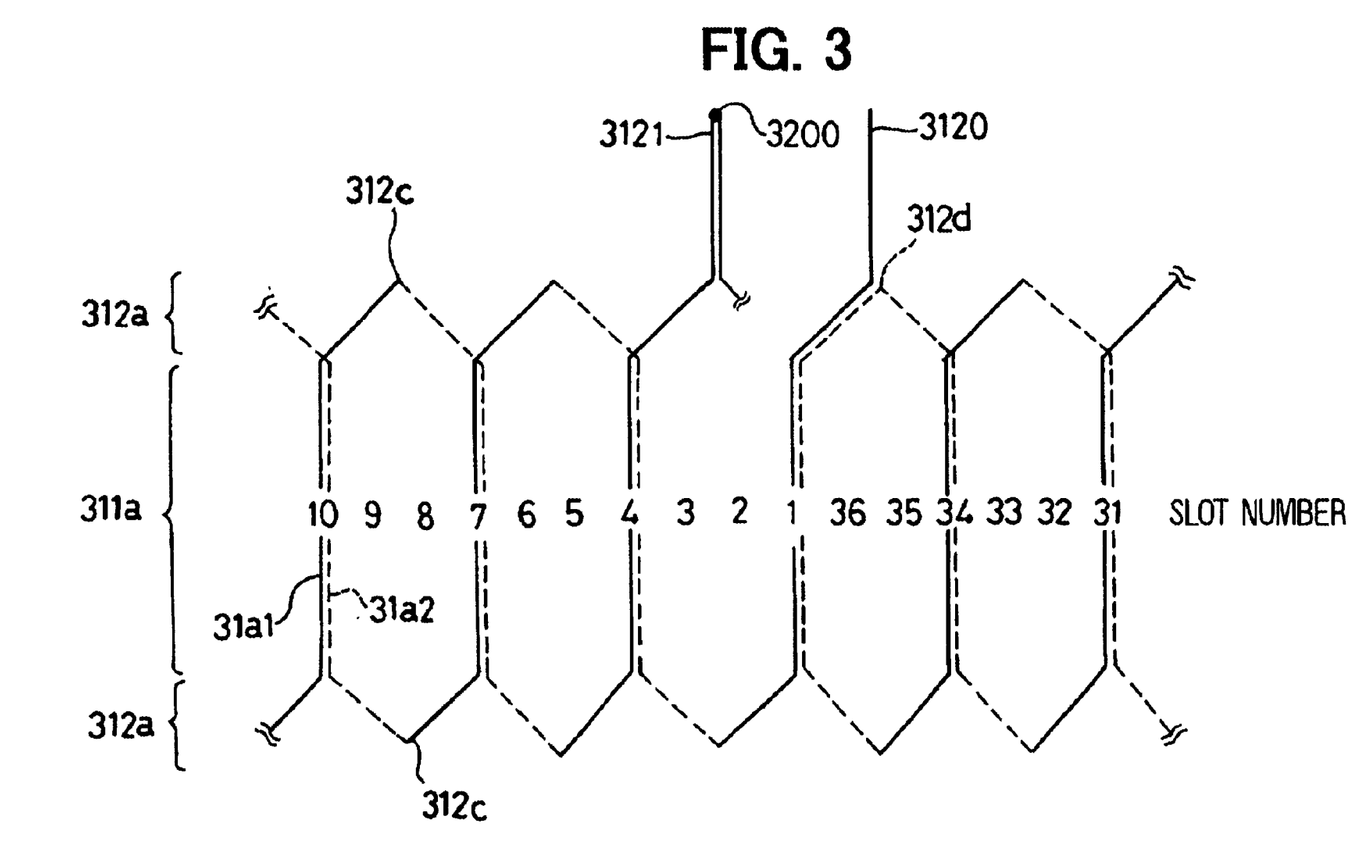
FIG. 3 is a diagram of the winding according to the first embodiment of the present invention.
Figure 4:
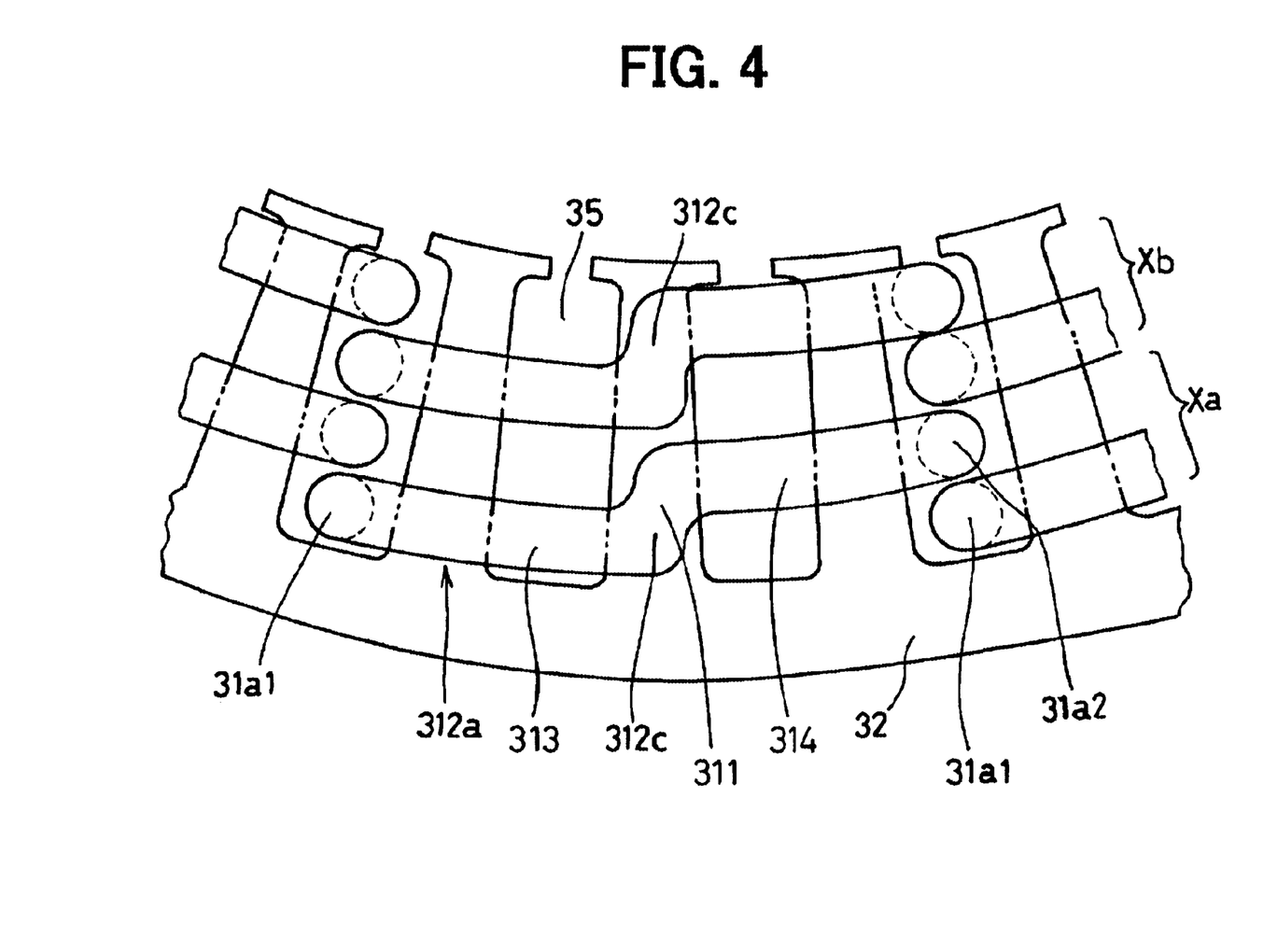
FIG. 4 is a plan view of the coil end according to the first embodiment of the present invention.
Figure 5:
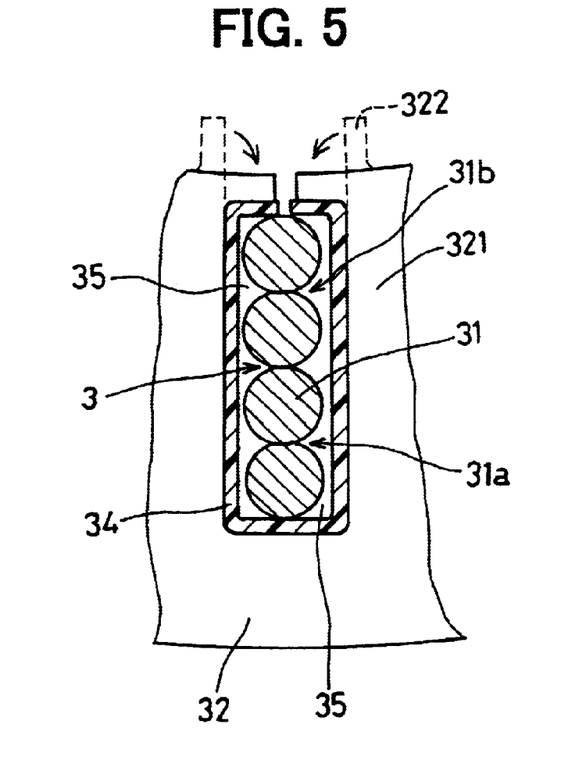
FIG. 5 is a sectional view of the stator according to the first embodiment of the present invention.
Figure 6:
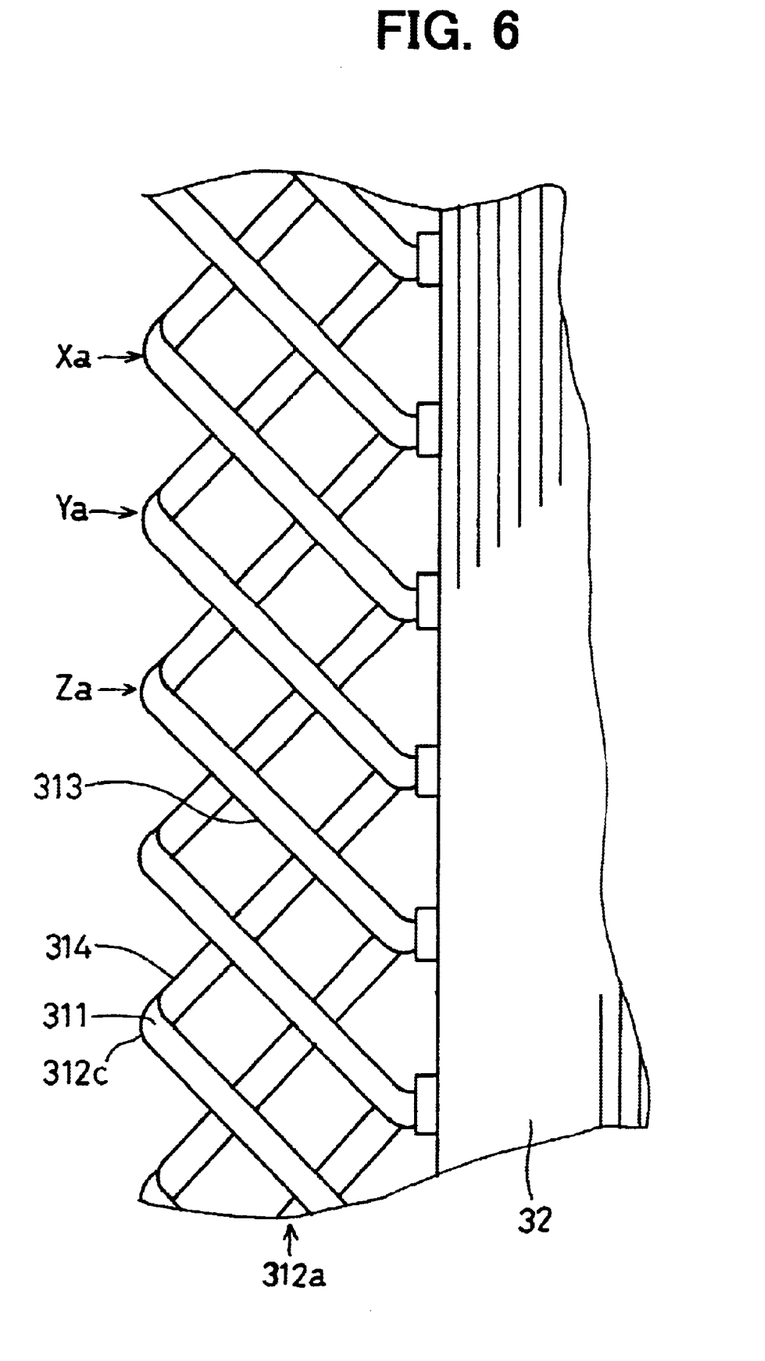
FIG. 6 is a plan view of the coil end viewing from radial outside according to the first embodiment of the present invention.

An alternator for a vehicle according to a first embodiment of the present invention is described with reference to the drawings. FIGS. 1 through 6 show the first embodiment of the present invention. FIG. 1 shows a general structure of the alternator. FIG. 2 and FIG. 3 show an individual X-phase winding. FIG. 4 shows two X-phase windings. FIG. 5 shows an arrangement of wires in a slot. FIG. 6 shows a part of an assembled stator viewing from a radial outside.

The alternator 1 has a shaft rotatably supported on a frame 4. A pulley 20 driven by an engine is fixed on a front end of the shaft. A rotor 2 and slip rings 9 and 10 are fixed on the shaft 21. The rotor 2 has a pair of pole cores 71 and 72 and a field winding 8 connected to the slip rings 9 and 10. Each of the pole cores 71 and 72 provides eight magnetic poles arranged circumferentially. The magnetic poles define a magnetic pole pitch. Cooling fans 11 and 12 are disposed on both sides of the rotor 2.

A stator 3 is supported on the frame 4 having a cylindrical stator core 32 and a stator winding 31. The stator core 32 is located opposite to the magnetic poles of the rotor 2. The stator core 32 has slots 35 which open on axial ends and radially inside the stator core 32. As shown in FIG. 5, an insulator 34 insulates an inside surface from accommodated windings 31. Each of the slots 35 provides four positions in radially arranged layers to accommodate portions of wires.

The stator winding 31 has portions accommodated in the slots 35 and a first and second coil end groups 312a. The wires are aligned in a radial direction in the slots 35.

The frame 4 has a pair of axial inlet openings 41 located on front and rear side walls and a pair of radial outlet openings 42 located radially outside of the first and second coil end groups 312a and 312b. The frame 4 may further support a control member having a three-phase rectifier and an output terminal 6.

In operation, an engine rotates the pulley 20, field current is supplied to the field winding 8 through the slip rings 9 and 10. The rotor 2 rotates and generates a rotating magnetic field to induce an AC current in the stator winding 31. The induced current in the stator winding 31 is rectified and supplied as DC power through the output terminal 6. The cooling fan 11 generates cooling wind flowing through the second coil end group 312a. The cooling fan 12 generates cooling wind flowing through the first coil end group 312a.

The stator winding 31 has two sub-winding sets 31a and 31b. Each of the sub-winding sets has three individual phase windings, X, Y and Z-phase windings. Therefore, the stator 31 has two individual windings having the same electric phase. For instance, a phase winding Xa in a first sub-winding set and a phase winding Xb in a second sub-winding set are connected to provide a X-phase winding of the poly-phase winding. The phase windings may be connected in either series or parallel. The connections are provided outside of the stator core after all of the phase windings are mounted on the stator core 32.

As shown in FIG. 2 and FIG. 3, the phase winding is made of a continuous jointless wire. The continuous wire provides at least one individual coil on the stator core 32. For instance, the continuous wire has at least three straight portions 311a. In this embodiment, the continuous wire provides an individual coil fully around the stator core 32.

The phase winding Xa in the first winding set has a start end 3120, a finish end 3121, a plurality of straight portions 311a and a plurality of turn portions 312c. The turn portions 312c form the coil end groups 312a on opposite sides. The straight portions 311a occupy outer layers 31a1 and inner layers 31a2. The outer layers 31a1 and inner layers 31a2 are stacked in a radial direction in the slots 35.

Each turn portion 312c connects a pair of straight portions 311a which are disposed in different slots 35, spaced apart by the magnetic pole pitch and disposed in the adjacent layer positions in their corresponding slots. For instance, each turn portion 312c connects an outer layer 31a1 and an inner layer 31a2 in different slots. Therefore, the straight portions 311a which are radially adjacent in the same slot are connected to each different turn portions extending in opposite directions.

The turn portion 312c has a center portion 311 twisted in a radial direction to provide a radial step and a pair of half portions 313 and 314 shifted a predetermined radial distance connected to opposite side of the center portion. The center portions 311 are also bent so that the pair of half portions 313 and 314 are inclined. The center portions 311 are placed on teeth formed between the slots 35 since the half portions have the same length.

The straight portions 311a and the turn portions 312c are alternately connected to form a wave winding from the start end 3120 to a thirty-fourth slot in ascending order. An irregular turn portion 312d is used between the thirty-fourth and first slots to provide a reverse connection. Then, a reverse wave winding is formed from the first slot to the finish end 3121 through a fourth slot in descending order. Therefore, the phase winding is wound around the stator core two times. The irregular turn portion 312d is not twisted to connect the straight portions 311a in the same layer.

The phase windings Ya and Za of the first sub-winding set are also formed in a similar manner for different slots. Each of the phase windings may be composed of a wave winding which is wound around the stator core once.

In a manufacturing process, each of the phase windings are individually formed and arranged into a cylindrical arrangement as the first sub-winding set. The phase windings can be assembled by loosening each phase windings and by separating the wave windings. The cylindrical first sub-winding set is shrunken to reduce a diameter by compressing from outside, and inserted into a center cavity of the stator core 32. Then, the shrunken sub-winding set is expanded to insert the straight portions 311a into the slots 35. It is preferable to use a spring back force to expand the shrunken sub-winding set.

Further, the second sub-winding set is formed and inserted in a similar manner. After that, ends 322 protruded from the teeth formed between the slots 35 are plastically deformed for narrowing the width of the inner openings of the slots 35. The sub-winding set may be manufactured by a method described in the following embodiment.

The phase windings in the same electric phase are connected in series to provide a single phase winding in the poly-phase winding 31. For instance, the phase winding Xa and Xb are connected in series via a connection 3200. The poly-phase winding 31 may have a star connection or a ring connection. These connections between the phase windings are formed outside the stator core 32.

As shown in FIGS. 4, 5 and 6, one of the sub-winding sets 31a or 31b occupies two radially adjacent pair of layers in the slot 35. The phase winding Xa in the first sub-winding set occupies the outer-most layer and the outer-middle layer. The phase winding Xb in the second sub-winding set occupies the inner-middle layer and the inner-most layer. The same applies to the other phases. The half portions 313 and 314 on the same layer are inclined in the same direction and are circumferentially spaced apart. Further, the half portions in the same layer are inclined in the different direction to the half portions in the adjacent layer. For instance, the half portions 313 in the outer-most layer cross the half portions 314 in the outer-middle layer.

In this embodiment, each of the sub-winding sets 31a and 31b are radially stacked in the slots 35. Therefore, the turn portions 312c are arranged side by side with respect to a radial direction on both sides of the stator core. The turn portions 312c are regularly arranged to avoid collisions except for regions in which the irregular turn portions 312d are disposed. Almost all of the turn portions 312c have gaps between them. The turn portions 312d and the turn portions 312c crossing with the turn portion 312d may have extra length and more complicated shape to avoid each other.

Figure 7:
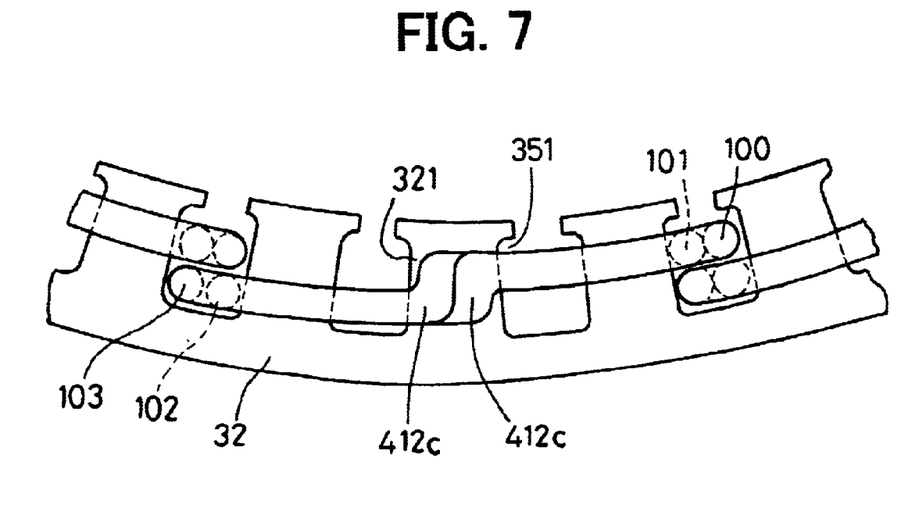
FIG. 7 is a plan view of the coil end according to a second embodiment of the present invention.

FIG. 7 shows a second embodiment of the present invention. The poly-phase winding has two sub-winding sets which are arranged circumferentially. Therefore, straight portions 100 and 101, straight portions 102 and 103, and turn portions 412c are arranged circumferentially. As a result, a poly-phase winding which has four turns (4T) in each phase is provided. The slot 351 has a narrower width than that of the teeth 321 formed between slots 351 to provide wider gaps between the turn portions 412c.

In the first and second embodiment, more sub-winding sets may be used to provide more wires in the slot to achieve a desired output. For instance, additional third and fourth sub-winding sets can be used. The poly-phase winding described in the second embodiment may be used as the sub-winding set in the first embodiment to provide an 8T winding.

Figure 8:
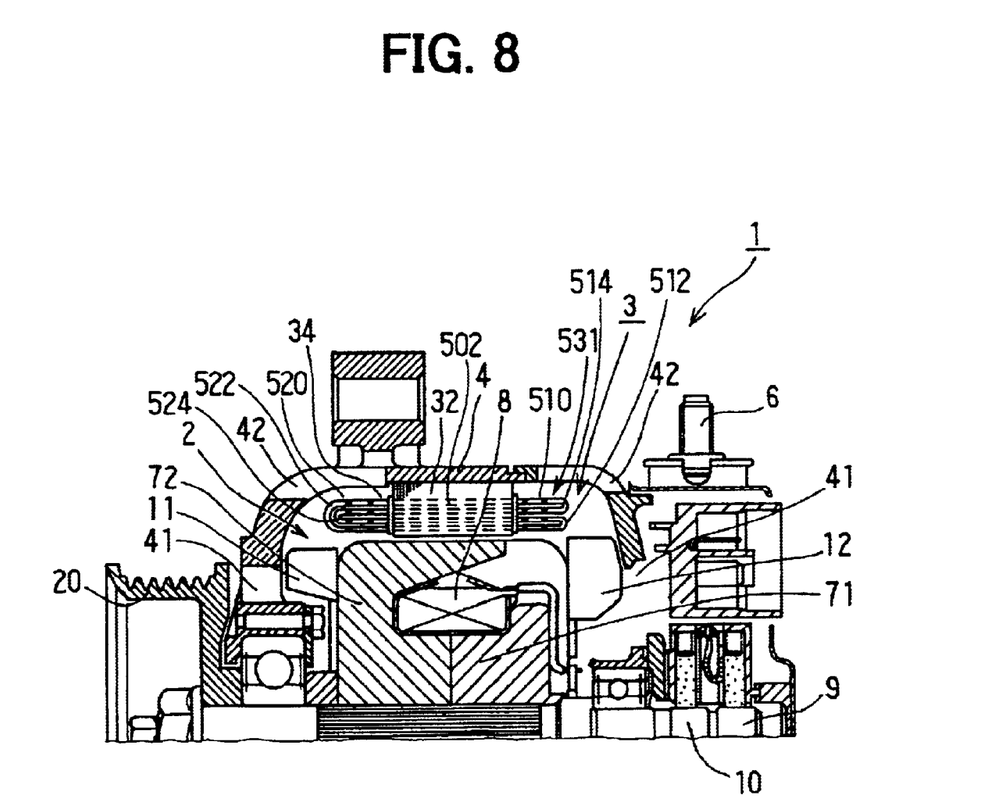
FIG. 8 is a sectional view of an alternator for vehicle according to a third embodiment of the present invention.

FIGS. 8 through 12 show a third embodiment of the present invention. FIG. 8 shows a general structure of the alternator. FIG. 9 through FIG. 12 show a manufacturing process of an individual phase winding.

The alternator 1 has a similar construction to the first embodiment except for a poly-phase winding 531. The poly-phase winding 531 has portions 502 accommodated in the stator core 32, a first coil end group 510 disposed on a rear side and a second coil end group 520 disposed on a front side. The first coil end group 510 has inner coil end 512 and outer coil ends 514 which are arranged side by side with respect to a radial direction. The inner and outer coil ends 512 and 514 are arranged circumferentially in a concentric arrangement. The second coil end group 520 has large coil ends 522 and small coil ends 524 which are arranged in a surrounding manner. The large coil ends 522 surround the small coil ends 524. The coil ends are regularly arranged except for regions where irregular coil ends are disposed. The coil ends are regularly arranged to avoid collisions. Almost all of the coil ends have gaps between them.

In a manufacturing process, the poly-phase winding is individually formed and assembled with the stator core 32. The poly-phase winding is a three phase winding that has X, Y and Z windings. The following process simultaneously forms these three windings.

Figure 9:
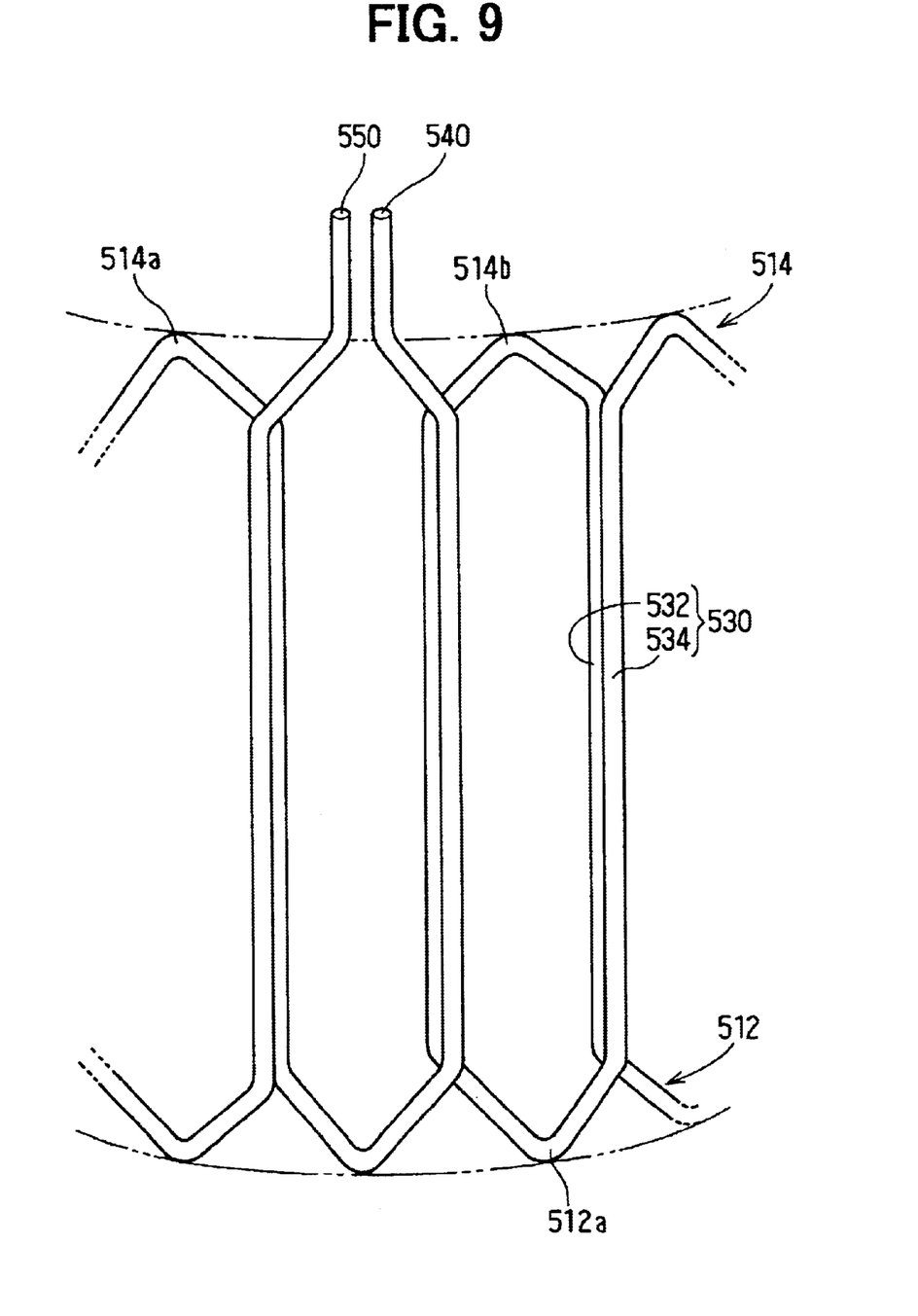
FIG. 9 is a perspective view of a winding according to the third embodiment of the present invention.
Figure 10:
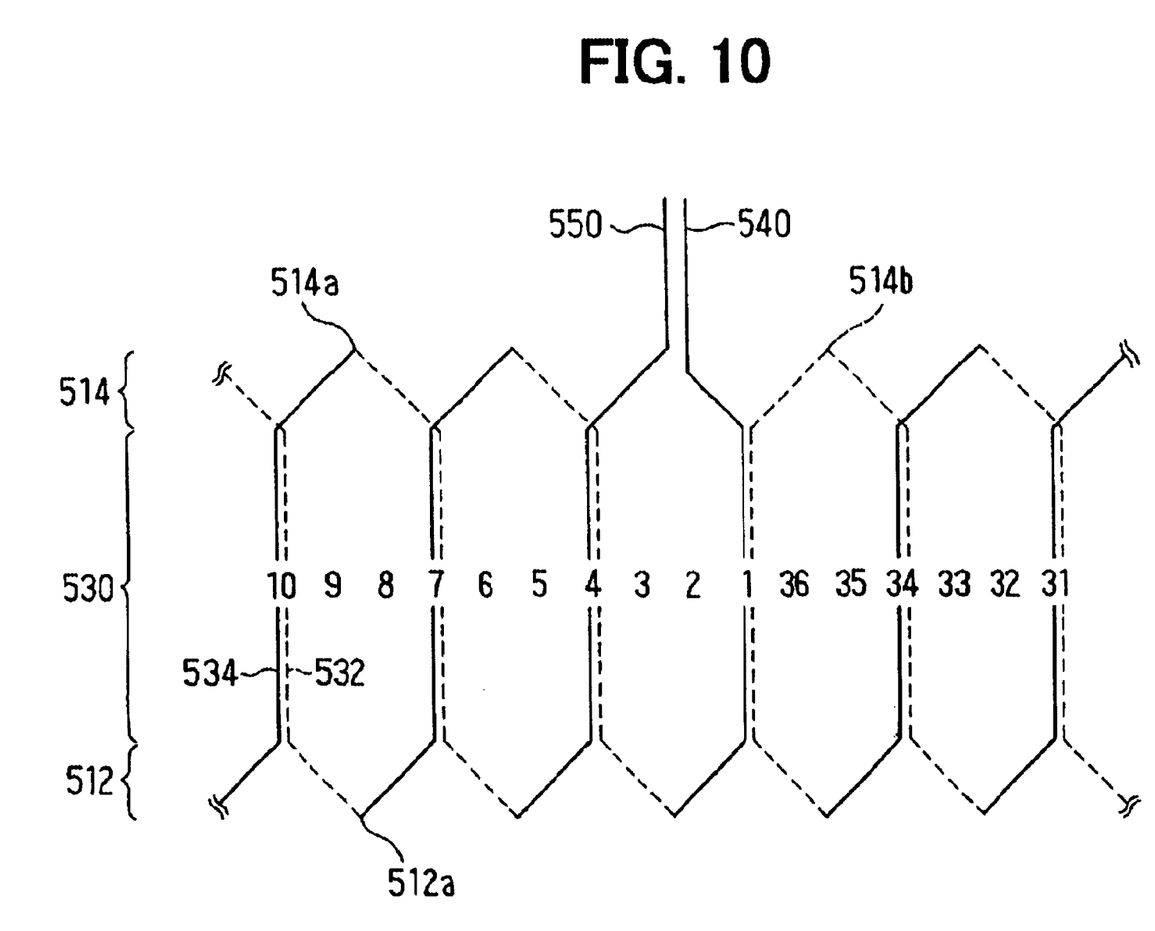
FIG. 10 is a diagram of the winding according to the third embodiment of the present invention.

FIG. 9 shows a phase winding X after a first step. FIG. 10 shows a wiring diagram of the phase winding X. Two wave windings are formed in a first step. The phase winding X is made of a continuous jointless wire from a start end 540 to a finish end 550. The phase winding X is arranged into a cylindrical shape.

The winding has straight portions 530 and turn portions 512 and 514 as the inner and outer coil ends. The straight portions 530 have inner layers 532 and outer layers 534. The turn portions 512 and 514 have regular turn portions 512a and 514a and an irregular turn portion 514b. The straight portions 530 and the turn portions 512 and 514 are alternately connected to form a wave winding from the start end 540 to a thirty-fourth slot in order ascending. An irregular turn portion 514b is used between the thirty-fourth and first slots to provide a reverse connection. Then, a reverse wave winding is formed from the first slot to the finish end 550 through a fourth slot in order descending.

The turn portions 512 and 514 connect a pair of two straight portions 530 which are spaced apart by a predetermined magnetic pole pitch. The regular turn portions 512a and 514a are twisted to connect the straight portions 530 in the different layers 532 and 534. The irregular turn portion 514b is not twisted to connect the straight portions 530 in the same layers 532.

Figure 11:
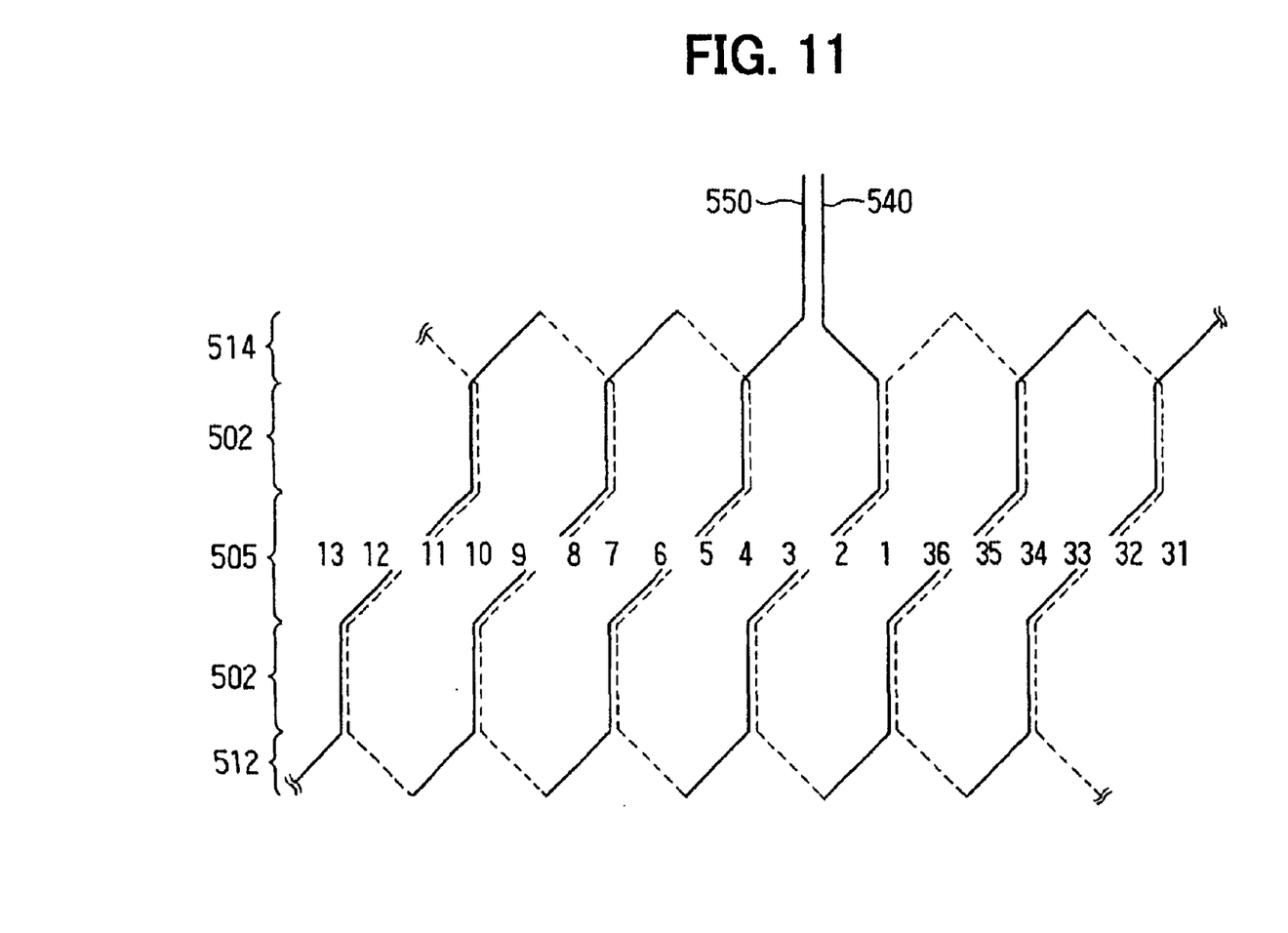
FIG. 11 is a diagram of the winding according to the third embodiment of the present invention.

FIG. 11 shows the phase winding X after a second step. In the second step, two straight portions 502 and shifting portions 505 are formed by twisting the straight portions 530. The straight portions 502 are formed as portions accommodated in the slots. Each of the straight portions 502 has a length corresponding to an axial length of the stator core 32. The shifting portions 505 are formed as the second coil end group 520 in the center of the straight portions 530. The shifting portions 505 are shifted by a magnetic pole pitch. For instance, the sifting portions 505 offset corresponding straight portions 502 by three slots. In FIGS. 10 and 11, the solid line indicates outer layers and the broken line indicates inner layers.

Figure 12:
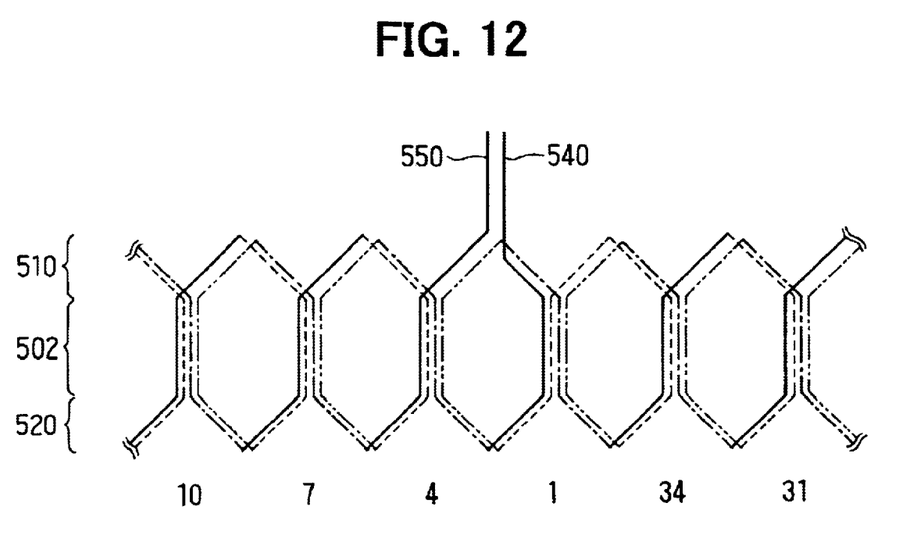
FIG. 12 is a diagram of the winding according to the third embodiment of the present invention.

FIG. 12 shows the phase winding after a third step. The windings are folded at the center of the shifting portions 505 to form the second coil end group 520. As a result, the phase winding X has four layered straight portions 502. In FIG. 12, the solid line indicates outer-most layers, the broken line indicates outer-middle layers, the chain line indicates inner-most layers and the chain double-dashed line indicates inner-middle layers.

The phase windings Y and Z are also formed with the phase winding X from the first step in a similar manner. Therefore, a cylindrically arranged poly-phase winding which has three phase windings is provided. The poly-phase winding is mounted on the stator core 32 and assembled into a star or ring connection in the same manner as described in the first embodiment.

In this embodiment, almost all of the turn portions are regularly arranged to prevent collisions. This avoids the need for an extra bending process, complex shaped turn portions or an extra length of the turn portion so as to prevent collisions. It is possible to reduce a joining process between conductor segments and an additional insulating process.

In the third embodiment, the ends 540 and 550 extend from the first coil end group 510. However, the ends 540 and 550 may extend from the second coil end group 520 by providing the ends 540 and 550 on the center of the straight portions 530.

Figure 13:
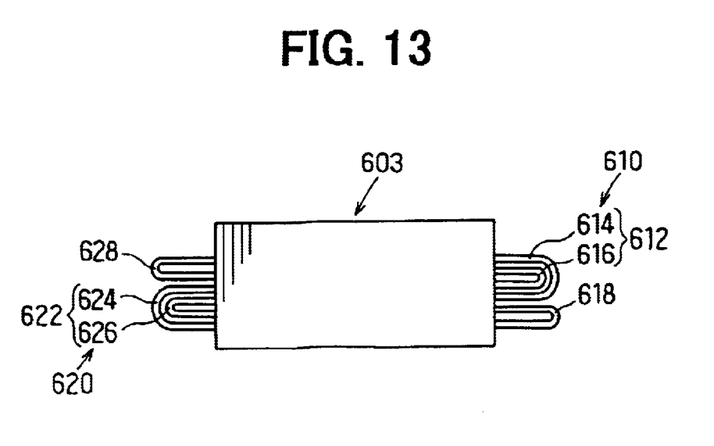
FIG. 13 is a sectional view of the stator according to a fourth embodiment of the present invention.

FIG. 13 shows a fourth embodiment of the present invention. In this embodiment, the winding is folded three times to provide six wires in the slot. The stator 603 has a first coil end group 610 and a second coil end group 620. The first coil end group 610 has a surrounding coil end group 612 which has large coil ends 614 and small coil ends 616. The first coil end group 610 also has inner coil ends 618. Therefore, the surrounding coil end group 612 also provides outer coil ends paired with the inner coil ends 618. Likewise, the second coil end group 620 has a surrounding coil end group 622 which has large coil ends 624 and small coil ends 626. The first coil end group 620 also has outer coil ends 628 to be paired with the surrounding coil end group 622. Therefore, the winding provides the concentric arrangement and the surrounding arrangement on both sides.

A flat or rectangular cross section wire may be used instead of a round cross section wire. Each wire may be composed of a plurality of fine wires to provide a flexible cross section. This wire can be inserted into the slots without the deforming process even when the inner opening is narrower. Further, it is possible to help the plastic deformation of the ends 322 by heating the portion to be deformed by supplying current in a concentrated manner.

The present invention may apply to a stator which has an even number of accommodated portions layered in one of the slot. The poly-phase winding may have more than three phase windings. The number of slots 35 is variable according to the number of magnetic poles and the number of phases. The present invention may apply to a generator, a motor or a rotary electric machine that selectively acts as a generator and a motor. The present invention may apply to a stator of an alternator for vehicle such as passenger vehicle, truck and shipping.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A stator of rotary electric machine, comprising:

a stator core having a plurality of slots;

a poly-phase winding disposed in the slots comprising a plurality of sub-winding sets, each sub-winding set comprising a plurality of phase winding including a plurality of straight portions disposed in the slots and a plurality of turn portions connecting the straight portions, the phase windings being made of a continuous wire providing an individual coil on the stator core; and connecting portions provided on an outside of the stator core connecting between the phase windings in the same phase, wherein each of the turn portions connects a pair of straight portions that are disposed in the slots spaced apart by a predetermined magnetic pole pitch and each straight portion is disposed in an adjacent position in its corresponding slot, and the turn portions are formed so that the straight portions disposed radially adjacent in the same slot are connected to turn portions extending in opposite directions, wherein the turn portion has a center portion twisted in a radial direction to provide a radial step and a pair of half portions shifted a predetermined radial distance at the center portion, and wherein the half portions of the phase windings located on a radial inner layer crosses the half portion of the other one of the phase windings located on a radial outer layer.

* * * * *